UNITED STATES PATENT OFFICE.

HARLEY J. MORRISON, OF CLIFTON, OHIO.

PROCESS OF RECOVERING GLYCERIN FROM SOAP-UNDERLYE.

SPECIFICATION forming part of Letters Patent No. 544,366, dated August 13, 1895.

Application filed October 19, 1894. Serial No. 526,398. (No specimens.)

*To all whom it may concern:*

Be it known that I, HARLEY J. MORRISON, a citizen of the United States, and a resident of the town of Clifton, in the county of Hamilton and State of Ohio, have invented a new and useful Process for the Recovery of Glycerin from Soap-Underlyes, of which the following is a specification.

The several features of my invention and the various advantages resulting from their use, conjointly or otherwise, will be apparent from the following description and claims.

In the manufacture of soap the underlye from the soap-kettles contains principally glycerine, common salt, (sodium chloride,) together with smaller quantities of soap, nitrogenous matter, sulphate of sodium, carbonate of sodium, caustic soda, and other minor unimportant substances. In the recovery of the glycerine from this spent lye by far the most difficult and important obstacles to remove are the sodium chloride and organic impurities. For the removal of this salt (sodium chloride) and organic impurities I treat the liquor (i. e., the underlyes, preferably after concentrating the underlyes to saturation point) with ammonia and then with carbonic-acid gas, thereby producing bicarbonate of ammonia, which latter reacts with the sodium chloride to form ammonium chloride and sodium bicarbonate.

To specify, in obtaining the reaction aforementioned—viz: the bicarbonate of ammonia resultant from treating the lye with ammonia and then with carbonic-acid gas—the process is as follows: $NH_3 + CO_2 + H_2O = HNH_4CO_3$. The reaction of the bicarbonate of ammonia with the sodium chloride to form ammonium chloride and sodium bicarbonate is as follows:

$HNH_4CO_3 + NaCl = HNaCO_3 + NH^4Cl.$

The foregoing is the preferable way, but the same result may be arrived at by treating the liquor with ammonium carbonate and carbonic-acid gas, or instead of forming the bicarbonate of ammonia in the liquor by at once treating the liquid with ammonium bicarbonate supplied from a source other than from the liquor. This latter is an expensive way of obtaining the desired result. When desired, these reagents—to wit: ammonia, carbonic acid, carbonate of ammonia, and bicarbonate of ammonia—may be suitably combined. The sodium bicarbonate formed by any of these methods is insoluble, as are also the organic impurities, and consequently are precipitated and can be removed by any suitable means.

The foregoing operation is conducted as far as is required. In practice all the sodium chloride cannot be converted into an insoluble precipitate. The small amount remaining unconverted is readily removed, as hereinafter mentioned. The extent to which said operation is to be conducted is determined by the manufacturer in view of the demand for glycerine, its price in the market, and the profitableness of the by-products. I then boil off the excess of ammonia and carbonic acid and add to the liquor a carbonate or oxide of calcium or of other alkali or metal or mixture thereof which will decompose ammonium chloride, thus freeing the liquor of all ammonia. Of the foregoing oxides or carbonates I preferably use the calcium or lead salt. If the lead salt is used at this point, an insoluble chloride of lead is formed and settles down, thus freeing the liquor of all the chlorine which was in combination with the ammonia. The liquor is then to be concentrated and retreated with ammonia and carbonic-acid gas, thus reducing the amount of sodium chloride in comparison with the amount of glycerine in the liquor. On the contrary, if the calcium salts be employed, the resulting calcium chloride formed in the liquor is not insoluble, and cannot be manipulated in the same way, as is the case where the lead salt is used, and the insoluble lead chloride is formed. In the event the liquor is treated with calcium salts and the calcium chloride is formed, I concentrate, by evaporation, the liquor and add sulphuric acid until all the calcium chloride has been made insoluble. This step is accomplished by the sulphuric acid uniting with the calcium chloride and converting it into calcium sulphate and setting free the hydrochloric acid. As sodium chloride is insoluble in hydrochloric acid, the remaining salt is also precipitated at this time. The liquor now containing, in solution, principally glycerine and hydrochloric acid, is next treated with oxide or carbonate of lead, or of other metal or mixture thereof, which will form an insoluble chloride. This precipitate being removed, the liquor containing the glycerine is now free from large quantities of salts; in fact, is theoretically free therefrom; but practically the liquor contains traces of the various salts, more or less, according to the care taken in the manipulation. It is now ready to be refined by any of the usual methods.

It will be observed that I employ and apply the aforementioned reactions in an exceedingly novel manner, not suggested by any of the cases wherein they have been heretofore employed. The purposes and objects for which I employ them, as herein specified, have been hitherto unknown. It will be understood that I apply these reactions not to make bicarbonate of soda as the primary object, but to convert sodium chloride, the greatest obstacle in the successful production of crude glycerine from underlyes, into an insoluble salt of sodium, and the organic impurities into an insoluble modification, in order that they may be removed and the chlorine combined with such an element that it can be readily and cheaply removed by subsequent operations and reactions.

What I claim as new and of my invention, and desire to secure by Letters Patent, is—

1. In the art of recovering glycerine from soap underlye, the improvement in the preliminary treatment thereof which consists of the conversion of the soluble salt of sodium chloride into the insoluble bicarbonate of soda by adding a carbonate of ammonia, removing the precipitate, adding to the remaining liquor an oxide or salt which will decompose the ammonium chloride formed and form an insoluble salt with the chlorine, such as lead oxide or carbonate, removing the precipitate thus formed, concentrating the remaining liquor, adding thereto a carbonate of ammonia, removing the precipitate, adding to the remaining liquor an oxide or salt which will decompose the ammonium chloride formed such as calcium oxide or carbonate, concentrating the remaining liquor, adding thereto sulphuric acid, removing precipitate formed, then adding an oxide or carbonate of lead to the remaining liquor and removing the precipitate, substantially as specified.

2. In the art of recovering glycerine from soap underlyes, the improvement in the preliminary treatment thereof which consists of the following feature, to wit: the conversion of the soluble chloride of sodium and organic impurities into the insoluble bi-carbonate of sodium and an insoluble modification of such organic impurities by adding thereto bi-carbonate of ammonia, substantially as specified.

3. In the art of recovering glycerine from soap underlyes, the improvement in the preliminary treatment thereof which consists of the following feature to wit: the conversion of the soluble chloride of sodium and organic impurities into the insoluble bi-carbonate of sodium and an insoluble modification of such organic impurities by adding thereto ammonia and carbonic acid, substantially as specified.

4. In the art of recovering glycerine from soap underlyes, the improvement in the preliminary treatment thereof which consists of the conversion of the soluble chloride of sodium into the insoluble bi-carbonate of sodium by adding thereto bi-carbonate of ammonia, removing the precipitate, adding an oxide or salt or mixture thereof which will decompose the ammonium chloride formed such as calcium oxide or carbonate then adding sulphuric acid, substantially as specified.

5. In the art of recovering glycerine from soap underlyes, the improvement in the preliminary treatment thereof which consists of the conversion of the soluble chloride of sodium into the insoluble bi-carbonate of sodium by adding thereto ammonia and carbonic acid, removing the precipitate, adding an oxide or salt or mixture thereof which will decompose the ammonium chloride formed such as oxide or carbonate of calcium, then adding sulphuric acid, substantially as specified.

6. In the art of recovering glycerine from soap underlyes, the improvement in the preliminary treatment thereof which consists of the following process, to wit: treating the liquor with bi-carbonate of ammonia, then removing the insoluble salt formed, boiling the remaining liquor with an oxide or salt or mixture thereof which will decompose the ammonium chloride formed such as oxide or carbonate of calcium, removing the precipitate, adding sulphuric acid, removing precipitate formed then adding oxide or carbonate of lead and removing the precipitate, substantially as specified.

7. In the art of recovering glycerine from soap underlyes, the improvement in the preliminary treatment thereof which consists of the following process, to wit: treating the liquor with ammonia and carbonic acid gas, then removing the insoluble salt formed, boiling the remaining liquor with an oxide or salt or mixture thereof which will decompose the ammonium chloride formed, such as oxide or carbonate of calcium, adding sulphuric acid, removing the precipitate formed, then adding oxide or carbonate of lead and removing the precipitate, substantially as specified.

8. In the art of recovering glycerine from soap underlye, the improvement in the preliminary treatment thereof which consists of the conversion of the soluble salt of sodium into the insoluble bicarbonate of soda, by adding thereto bicarbonate of ammonia, removing the precipitate, adding to the filtrate an oxide or carbonate of lead or of other metal or mixture thereof which forms an insoluble salt with chlorine removing the precipitate, concentrating the filtrate, then again treating with bicarbonate of ammonia, removing the precipitate, adding to the filtrate an oxide or salt or mixture thereof which will decompose the ammonium chloride formed, such as oxide or carbonate of calcium, then adding sulphuric acid, substantially as specified.

9. In the art of recovering glycerine from soap underlye, the improvement in the preliminary treatment thereof which consists of the conversion of the soluble salt of sodium into the insoluble bicarbonate of soda by adding thereto ammonia and carbonic acid, removing the precipitate, adding to the filtrate an oxide or carbonate of lead, or of other metal, or mixture thereof, which forms an insoluble salt with chlorine, removing the precipitate, concentrating the filtrate, then again treating with ammonia and carbonic acid, removing the precipitate, adding to the filtrate an oxide or salt or mixture thereof which will decompose the ammonium chloride formed such as oxide or carbonate of calcium, then adding sulphuric acid, substantially as specified.

HARLEY J. MORRISON.

Attest:
  WM. E. JONES,
  K. SMITH.